Figure 1:
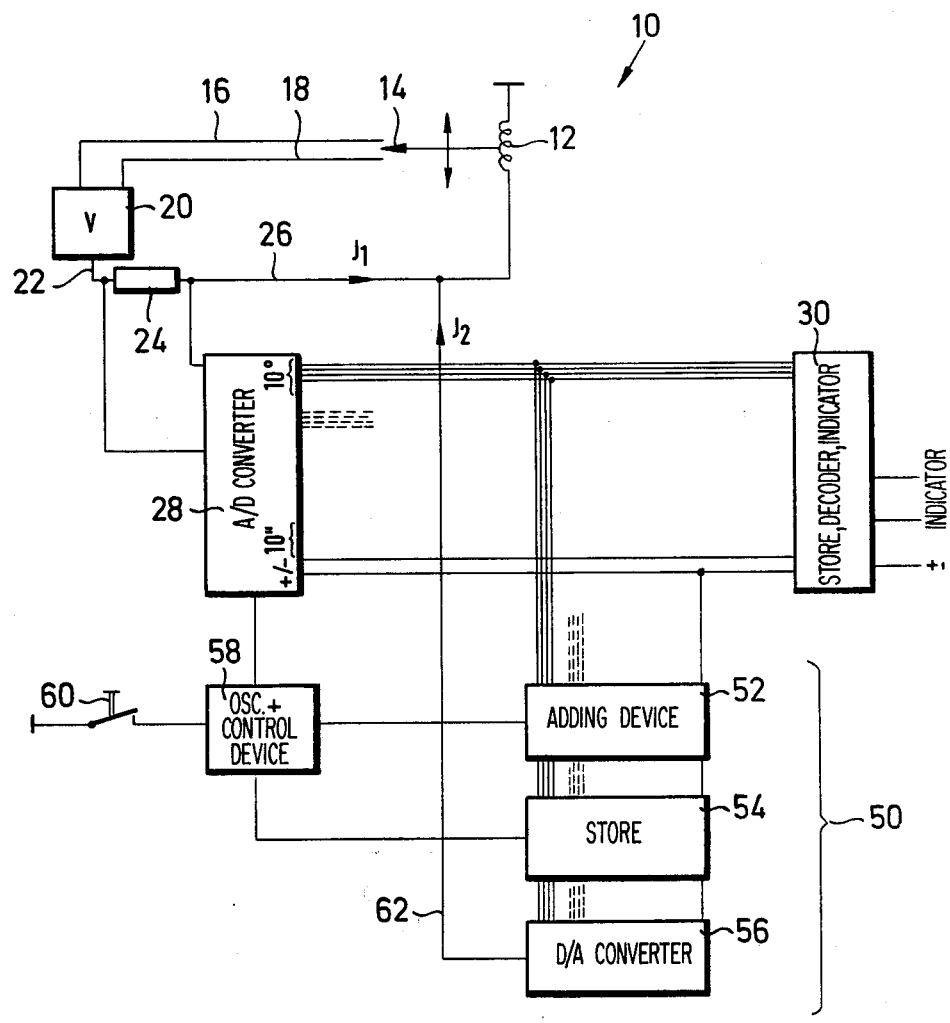

United States Patent [19]

Melcher

[11] 4,074,781
[45] Feb. 21, 1978

[54] ELECTROMAGNETICALLY COMPENSATING WEIGHING OR DYNAMOMETER APPARATUS

[75] Inventor: Franz Josef Melcher, Ellierode, Germany

[73] Assignee: Sartorius-Werke GmbH (und. vorm. Gottinger Praezisionswagenfabrik GmbH), Gottingen, Germany

[21] Appl. No.: 697,260

[22] Filed: June 17, 1976

[30] Foreign Application Priority Data

June 24, 1975   Germany .............................. 2528141

[51] Int. Cl.² ...................... G01G 7/02; G01G 23/16
[52] U.S. Cl. .................................... 177/212; 177/165
[58] Field of Search ............... 177/212, 165, 210 EM, 177/DIG. 3

[56] References Cited

U.S. PATENT DOCUMENTS

| 3,092,197 | 6/1963 | Ecker | 177/210 EM |
| 3,888,321 | 6/1975 | Wiiki | 177/165 |

FOREIGN PATENT DOCUMENTS 1,362,770  8/1974  United Kingdom ................. 177/212

Primary Examiner—Joseph W. Hartary
Attorney, Agent, or Firm—Browdy and Neimark

[57] ABSTRACT

Electromagnetically compensating weighing or dynamometer apparatus in which a coil moves out of an equilibrium position relative to a magnet under the influence of a force, including a compensating circuit providing a compensation current proportional to the amplitude of the deflection, an a taring arrangement comprising a store and a digital/analog converter connected to the coil in parallel to the compensation circuit.

9 Claims, 2 Drawing Figures

4,074,781

ELECTROMAGNETICALLY COMPENSATING WEIGHING OR DYNAMOMETER APPARATUS

This invention relates to electromagnetically compensating weighing or dynamoneter apparatus.

With such apparatus it is known to provide a coil in the working gap of a magnet and which is associated with a movable part of the apparatus and is deflected under the action of a force out of a preadjusted position of equilibrium in relation to the magnet. The apparatus also includes (1) a compensation circuit which comprises a a position indicator, a power amplifier, and the coil, and which, when a deflection occurs, allows a compensation current proportional to the amplitude of the deflection to flow through the coil, (2) an analog-digital (A/D) converter connected to a digitally operating measurement indicator, and (3) a taring arrangement.

The invention is concerned with providing an improved such apparatus so that, at relatively low cost, an optimum measuring range is maintained which is independent of the subject which is to be tared.

According to the invention there is provided an electromagnetically compensating weighing or dynamometer apparatus comprising a coil provided in the working gap of a magnet, said coil being associated with a movable part of the apparatus and being deflected under the action of a force out of a preadjusted position of equilibrium in relation to the magnet; a compensation circuit which comprises a position indicator, a power amplifier, and said coil and which, when a deflection occurs, allows a compensation current proportional to the amplitude of the deflection to flow through the coil; an analog-digital (A/D) converter connected to a digitally operating measurement indicator; and a taring circuit which comprises, connected in series, a store and a digital-analog (D/A) converter, the input of the store being connected to the output of said A/D converter, and the output of the D/A converter being connected to the coil to form a taring circuit in parallel to the compensation circuit.

An important advantage of the invention consists in that the range of measurement of the compensation circuit for taring purposes is in no way restricted by the weight of the part which is to be tared.

Another important advantage of the invention consists in that the D/A converter provided in the taring circuit need not be of very high quality. Only low drift behaviour is required in the static state, while no great requirements have to be imposed in respect of linearity and gauge factor. Any deviations between the compensation current produced by the compensation circuit for the taring operation and the taring current produced by the taring circuit on taking over the taring operation will in fact be completely compensated by subsequent re-taring operations. These re-taring operations take place until the indicator shows the value zero, while the taring circuit transmits through the coil the taring current necessary for the taring operation.

The taring circuit employed in the invention can be utilised advantageously both in a form of construction of an electromagnetically compensating apparatus in which the compensation circuit comprises a measuring resistor across which the A/D converter is connected in parallel, and in a form of construction in which the compensation circuit comprises, in a series connection, a forward-backward counter which is operated in dependence on the direction of deflection and which, together with a timing oscillator, forms the A/D converter, and a D/A converter which is connected by its digital input to the output of the counter and whose analog output is connected to the coil.

In the embodiment utilising a measuring resistor, the taring circuit advantageously comprises an adder connected upstream of the store, while in the embodiment having a forward-backward counter, it is preferable for the taring circuit to have a forward-backward counter which is connected upstream of the store and whose inputs are connected to the corresponding inputs of the forward-backward counter in the compensation circuit.

In a preferred embodiment, the taring circuit comprises a control unit which, on operation of an associated taring key, repeats the taring operation until the measuring indicating device indicates the value zero.

The D/A converter in the compensation circuit and/or that in the taring circuit is or are advantageously provided with reference means, which is preferably a zener diode reference or a mass reference.

Figure 2:
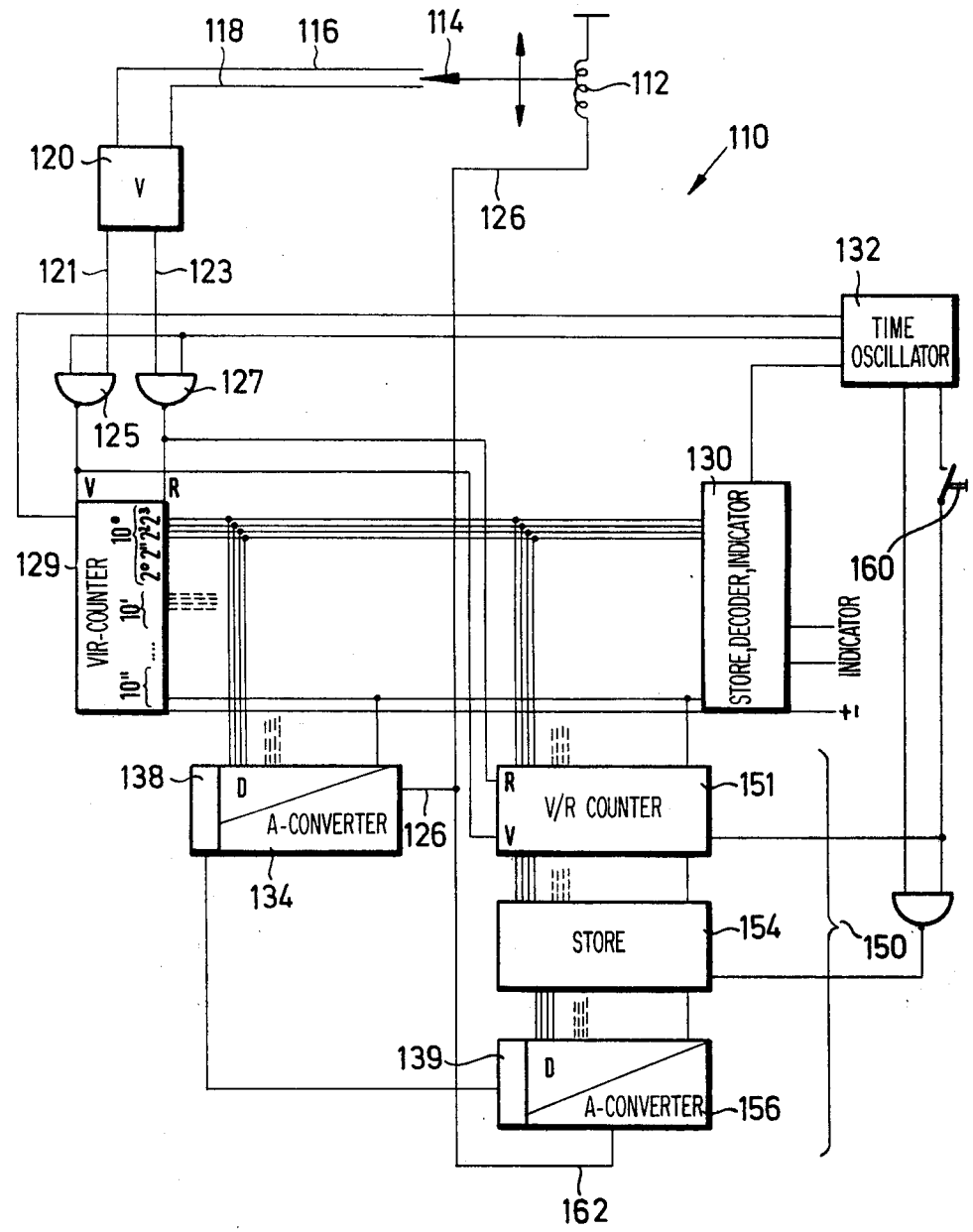

Preferred features of the invention are described below, by way of example, and with reference to the accompanying diagrammatical drawings, in which:

FIG. 1 is a block circuit diagram of the electronic portion of an electromagnetically compensating weighing or dynamometer apparatus, provided with a taring circuit as employed in the invention, and FIG. 2 shows a different form of construction of an electromagnetically compensating weighing or dynamometer apparatus, likewise provided with a taring circuit as employed in the invention.

As shown in the drawings, an electromagnetically compensating weighing or dynamometer apparatus 10 comprises a magnet arrangement (not shown) in whose air gap (likewise not shown) a compensation coil 12 is disposed.

The compensation coil 12 is connected to the movable part (not shown) of the apparatus. In addition, a position indicator 14 is connected to the compensation coil 12 and shows whether the compensation coil 12 in the air gap of the magnet arrangement is situated in a pre-adjusted position of equilibrium or has been deflected under the action of a force.

As shown in the drawing, the position indicator 14 has two direction-dependent output lines 16 and 18, each of which is connected to its own input of an amplifier 20. The output of the amplifier 20 is connected by a line 22 to one end of a measuring resistor 24 whose other end is connected by way of a line 26 to one end of the compensation coil 12. The other end of the compensation coil 12, like the amplifier 20, is earthed.

The position indicator 14, its output lines 16, 18, the amplifier 20, the line 22, the measuring resistor 24, the line 26, and the compensation coil 12 form the control circuit of the electromagnetically compensating apparatus 10. As long as the compensation coil 12 is situated in the preadjusted position of equilibrium, the position indicator 14 will supply no signal to the amplifier 20, which thus also supplies no current through the line 22. However, as soon as the compensation coil 12 is deflected out of its position of equilibrium, the position indicator 14 indicates the deflection in accordance with its direction and causes the amplifier 20 to pass a likewise direction-dependent compensation current $I_1$ through the line 22, the measuring resistor 24, and the line 26 to the compensation coil 12, so that the latter is returned to its preadjusted position of equilibrium.

According to FIG. 1, an analog-digital (A/D) converter 28 is connected in parallel to the measuring resistor 24. In the embodiment illustrated as an example this A/D converter 28 is a digital voltmeter which measures the voltage falling through the measuring resistor 24 and transmits it in digital form to an indicator device 30 comprising a store, a decoder, a display drive means, and a display.

A taring arrangement 50 is connected by branch lines to the connecting lines between the A/D converter 28 and the indicator device 30. The taring arrangement 50 comprises, serially connected, an adding device 52, a store 54, and its own digital-analog (D/A) converter 56, as well as a control unit 58 which comprises an oscillator and whose input can be brought into operation by means of a taring key 60, this control unit being connected by way of one output line to the A/D converter 28, by way of a second output line to the adding device 52, and by way of a third output line to the store 54. Furthermore, the output of the D/A converter 56 of the taring arrangement 50 is connected by way of a line 62 to the same end of the compensation coil 12 as the line 26.

The taring arrangement 50 of the invention works in the following manner:

As soon as the part which is to be tared applies a force to the apparatus 10 the compensation coil 12 is deflected out of its position of equilibrium, so that the position indicator 14 causes the amplifier 20 to transmit the compensation current $J_1$ through the coil 12. In the measuring resistor 24 the compensation current $J_1$ produces a voltage drop which is recorded by the A/D converter 28 and fed to the indicator device.

When the taring key 60 is operated, the control unit 58 causes the adding device 52 to add the values supplied by the A/D converter 28 during the taring operation, in order to obtain the measured value which is to be tared. This measured value to be tared is then stored in the store 54 and by the latter fed to the D/A converter 56 of the taring arrangement 50. The D/A converter 56 supplies a taring current $J_2$ which corresponds to the digital measurement fed to it and which flows through the compensation coil 12. The weight compensation required for the taring operation is thus taken over by the taring current $J_2$, while the compensation current $J_1$ supplied by the amplifier 20 assumes the value zero, corresponding to the summation equation, under the control of the control circuit formed by the position indicator 14, amplifier 20, measuring resistor 24, and compensation coil 12, so that the A/D converter 28 causes the value zero to be displayed in the indicator device 30.

Deviations of linearity and variations of gauge factor in the D/A converter 56 of the taring arrangement 50 are compensated by means of the adding device 52. Such deviations of linearity and variations of gauge factor have the consequence that the taring current $J_2$ is not equal to the compensation current $J_1$. Such a deviation is however compensated by subsequent re-taring operations. When such a deviation in the current intensity occurs between the compensation current $J_1$ originally flowing on the initiation of the taring operation and the taring current $J_2$ produced by the D/A converter 56, the A/D converter 28 records this differential current and causes it to be displayed. By means of the control unit 58 the differential current still recorded is then added in the adding device 52 to the taring current $J_2$ produced by the D/A converter 56. These re-taring operations continue until the A/D converter 28 records no further voltage drop through the measuring resistor 24. The part to be tared is then completely compensated, while for the subsequent actual measuring operation the entire measurement range of the control unit and of the A/D converter 28 still remains available without restriction.

This additive taring is thus possible with great accuracy with the aid of a D/A converter 56, for which only low drift is required, whereas linearity, gauge factor, and other magnitudes are of little importance, since deviations caused by them can be compensated by the above-described re-taring operations with the aid of the adding device 52, which is provided for the purpose.

In FIG. 2, identical parts to those in FIG. 1 are given the same reference numerals preceded by the numeral 1 for differentiation purposes.

As shown in FIG. 2, the apparatus 110 likewise comprises a compensation coil 112, a position indicator 114 having two output lines 116, 118, and an amplifier 120 operated in dependence on direction. However, instead of the measuring resistor 24 provided in the embodiment illustrated in FIG. 1, in the embodiment illustrated in FIG. 2 a forward-backward counter 129 is connected at its inputs V and R by way of two AND gates 125 and 127, on the one hand by way of lines 121 and 123 to the amplifier 120 and on the other hand to the timing oscillator of a control unit 132. The outputs of the forward-backward counter 129 are connected to appertaining inputs of a digital-analog (D/A) converter 134, whose output is connected by way of the line 126 to the no-nearthed end of the compensation coil 112. In addition, the outputs of the forward-backward counter 129 are connected to an indicator device 130 comprising a store, a decoder, a display drive means, and a display.

The taring arrangement 150 of the embodiment shown in FIG. 2 comprises, like that shown in FIG. 1, disposed serially one behind the other, a store 154 and a D/A converter 156 whose output is connected by way of the line 162 to the line 126 leading to the compensation coil 112. However, in the embodiment shown in FIG. 2 a forward-backward counter 151 is in addition connected upstream instead of the adding device provided in the embodiment shown in FIG. 1.

In FIG. 2, the two D/A converters 134 and 156 have their own reference units 138 and 139 respectively. These reference units may comprise a zener diode reference or a mass reference.

As in the embodiment shown in FIG. 1, in that shown in FIG. 2 a difference between the compensation current produced originally by the D/A converter 134 on initiation of the taring operation and the taring current then taken over by the D/A converter 156 is likewise compensated by re-taring operations of the kind described above.

What we claim is:

1. An electromagnetically compensating weighing or dynamometer apparatus comprising: a coil provided in a working gap of a magnet, said coil being operatively associated with a movable part of the apparatus and being deflected under action of a force out of a preadjusted position of equilibrium in relation to said magnet;

a compensation circuit which includes a position indicator coupled to said coil, a power amplifier responsive to position of said indicator, and said coil and which, when a deflection occurs, allows a compensation current proportional to the amplitude of the deflection to flow through said coil;

an analog-digital (A/D) converter coupled to said compensating circuit and responsive to an output therefrom and having its output coupled to a digitally operating measurement indicator; and a taring arrangement which includes, connected in series, a store and a digital-analog (D/A) converter, an input of said store being coupled to an output of said A/D converter which is coupled with said measurement indicator, and an output of said D/A converter being connected to said coil, forming a taring circuit having its output coupled in parallel to that portion of said compensation circuit exclusive of said compensation coil.

2. An apparatus according to claim 1, wherein the compensation circuit comprises a measuring resistor across which the A/D converter is connected in parallel.

3. An apparatus according to claim 2, wherein the taring circuit comprises an adder connected upstream of the store.

4. An apparatus according to claim 1, wherein the compensation circuit comprises, in series connection, a forward-backward counter which is operated in dependence on the direction of the deflection and which, together with a timing oscillator, forms the A/D converter, and a D/A converter whose digital input is connected to the output of the counter and whose analog output is connected to the coil.

5. An apparatus according to claim 4, wherein the taring circuit includes a forward-backward counter which is connected upstream of the store and whose inputs are connected to the corresponding inputs of the forward-backward counter in the compensation circuit.

6. An apparatus according to claim 1, wherein the taring circuit comprises a control unit which, on operation of an associated taring key, repeats the taring operation until the measurement indicator indicates the value zero.

7. An apparatus according to claim 1 wherein the D/A converter in the compensation circuit and/or the D/A converter in the taring circuit is or are provided with reference means.

8. An apparatus according to claim 7, wherein the reference means is a zener diode.

9. An apparatus according to claim 7, wherein the reference means is a mass reference.

* * * * *